United States Patent
Hu et al.

(10) Patent No.: US 9,891,439 B2
(45) Date of Patent: Feb. 13, 2018

(54) LIGHT SOURCE, LIGHT COMBINING DEVICE, AND PROJECTION DEVICE WITH THE LIGHT SOURCE

(75) Inventors: Fei Hu, Shenzhen (CN); Yi Li, Shenzhen (CN)

(73) Assignee: APPOTRONICS CORPORATION LIMITED, Shenzhen (CN)

(*) Notice: Subject to any disclaimer, the term of this patent is extended or adjusted under 35 U.S.C. 154(b) by 563 days.

(21) Appl. No.: 14/342,373

(22) PCT Filed: Jul. 3, 2012

(86) PCT No.: PCT/CN2012/078131
§ 371 (c)(1),
(2), (4) Date: Mar. 6, 2014

(87) PCT Pub. No.: WO2013/029422
PCT Pub. Date: Mar. 7, 2013

(65) Prior Publication Data
US 2014/0240677 A1   Aug. 28, 2014

(30) Foreign Application Priority Data
Aug. 29, 2011   (CN) .......................... 2011 1 0253070

(51) Int. Cl.
*F21V 13/00* (2006.01)
*G02B 27/14* (2006.01)
(Continued)

(52) U.S. Cl.
CPC ......... *G02B 27/14* (2013.01); *G02B 27/0905* (2013.01); *G02B 27/0977* (2013.01);
(Continued)

(58) Field of Classification Search
CPC .................................................... G02B 27/14
See application file for complete search history.

(56) References Cited

U.S. PATENT DOCUMENTS

| | | | | |
|---|---|---|---|---|
| 696,872 A | * | 4/1902 | Beeson | D05B 47/00 112/59 |
| 3,648,235 A | * | 3/1972 | Cahill | F21V 9/08 340/815.53 |

(Continued)

FOREIGN PATENT DOCUMENTS

| | | |
|---|---|---|
| CN | 101004483 A | 7/2007 |
| CN | 101201458 | 6/2008 |

(Continued)

OTHER PUBLICATIONS

Chinese Office Action, dated Jan. 11, 2013, in a counterpart Chinese patent application, No. CN 201110253070.4.
(Continued)

*Primary Examiner* — Andrew Coughlin
*Assistant Examiner* — Keith Delahoussaye
(74) *Attorney, Agent, or Firm* — Chen Yoshimura LLP

(57) ABSTRACT

A light source comprises a light combining device for guiding incident light from a first light emitting source (310) and incident light from a second light emitting source (340) with different incident directions to combine two paths of incident light into one path of emission light emitted from a first optical path. The light combining device comprises a guide part (330), for guiding light from the second light emitting source (340) to converge into the first optical path, and hindering a part of light from the first light emitting source (310) from entering the first optical path, the luminous flux of the hindered part of the light being less than the luminous flux of light from the first light emitting source (310) entering the first optical path. This light source can effectively reduce the cost and achieve a better heat dissipation effect and is especially suitable for a projection device.

16 Claims, 8 Drawing Sheets

(51) Int. Cl.
    *G03B 21/20*     (2006.01)
    *G02B 27/09*     (2006.01)
    *G02B 27/10*     (2006.01)

(52) U.S. Cl.
    CPC ..... *G03B 21/2013* (2013.01); *G03B 21/2066* (2013.01); *G02B 27/1006* (2013.01)

(56) References Cited

U.S. PATENT DOCUMENTS

| | | | | |
|---|---|---|---|---|
| 5,095,629 | A * | 3/1992 | Klemer | G01C 15/02 33/293 |
| 5,291,028 | A * | 3/1994 | Droge | G06K 7/10722 235/462.06 |
| 6,890,108 | B2 * | 5/2005 | Symanowski | G02B 6/00 362/559 |
| 6,960,872 | B2 * | 11/2005 | Beeson | F21V 5/041 313/113 |
| 7,520,641 | B2 * | 4/2009 | Minano | F21S 48/1241 362/297 |
| 2003/0058419 | A1 | 3/2003 | Roddy et al. | |
| 2008/0068819 | A1 | 3/2008 | Ming-Kuen et al. | |
| 2010/0053564 | A1 * | 3/2010 | Itoh | F21V 7/04 353/37 |
| 2010/0309439 | A1 | 12/2010 | Bi et al. | |
| 2012/0026721 | A1 * | 2/2012 | Kurt | F21S 48/115 362/84 |
| 2012/0307512 | A1 * | 12/2012 | Cogger | G02B 21/06 362/553 |

FOREIGN PATENT DOCUMENTS

| | | |
|---|---|---|
| CN | 201104278 | 8/2008 |
| CN | 101261429 A | 9/2008 |
| CN | 201134006 Y | 10/2008 |
| CN | 101430491 | 5/2009 |
| CN | 101430493 A | 5/2009 |
| CN | 101430494 A | 5/2009 |
| CN | 101527982 | 9/2009 |
| CN | 102147573 A | 8/2011 |
| CN | 102411205 A | 4/2012 |
| JP | H10-096875 | 4/1998 |
| JP | 2001-027781 | 1/2001 |
| JP | 2003-103838 | 4/2003 |
| JP | 2004-029267 A | 1/2004 |
| JP | 2007-200782 | 8/2007 |
| JP | 2011-505019 | 2/2011 |
| WO | 2009157098 | 12/2009 |

OTHER PUBLICATIONS

Chinese Office Action, dated Jul. 21, 2014, in a counterpart Chinese patent application, No. CN 201110253070.4.
International Search Report in the parent PCT application No. PCT/CN2012/078131, dated Oct. 4, 2012.
IPRP in the parent PCT application No. PCT/CN2012/078131, dated Sep. 19, 2012.
Japanese Office Action, dated Mar. 1, 2016, in a counterpart Japanese patent application, No. JP 2014-527471.
Extended European Search Report in related application No. 12827249.9, dated Jun. 12, 2015.
Thomson Scientific, "Database WPI", Week 200901, XP-002739322, London, Great Britain.
Chinese Office Action, dated Mar. 1, 2016, in a counterpart Chinese patent application, No. CN 201410462795.8.

* cited by examiner

LIGHT SOURCE, LIGHT COMBINING DEVICE, AND PROJECTION DEVICE WITH THE LIGHT SOURCE

FIELD OF THE INVENTION

This invention relates to light source technology, and in particular, it relates to structures and devices for combining light beams from multiple light emitting sources.

DESCRIPTION OF THE RELATED ART

With the development of light source technology, single light emitting source used in a light source cannot meet the requirement. Especially with the development of solid state light source, light emitting diodes (LED) and semiconductor lasers (LD, laser diode) are increasingly used in lighting and display industry, and multiple light emitting sources arranged as an array are commonly used in a high power light source, such as LED array or LD array. The lights from these light emitting sources are combined to form the high power output light of the light source. But in some application such as projection display a high brightness light source is needed. In the case that only LED array is used, the cost will be low but the brightness cannot meet the requirement of the mainstream projection display. And in the case that only LD array is used, the brightness is high enough but the cost is too high. So if light emitting diodes and semiconductor lasers can be used together in a light source, with brightness that can meet the requirement and cost that is competitive compared with the case where only a semiconductor laser array is used, this light source will have good potential in practical applications.

Etendue is used to describe the area and angle distribution of light in space. The average brightness of a light source is equal to the luminous flux of the light source divided by the light source's etendue. When the luminous fluxes of two light emitting sources are the same, and the etendue of the two are also the same (such as two same LED light sources), if the lights from the two light emitting sources are combined in a geometric manner, the total luminous flux is twice as large as the flux of a single light emitting source, and the etendue of the combined light is also twice as large as the etendue of a single light emitting source, so the result is there is no difference between the brightness of the combined light and a single light emitting source.

If the brightness of the two light emitting sources are different, such as a light emitting diode and a laser diode, the above etendue based method can also be used to analyze the case where these two light emitting sources are combined. Suppose that the luminous flux of the light emitting diode is Φ, its etendue is E, then the average brightness will be Φ/E; the luminous flux of the laser diode is also Φ, its etendue is 0.01E, then the average brightness will be 100Φ/E. Therefore if a light emitting diode and a laser diode described here are combined, the total luminous flux will be 2Φ with an etendue of 1.01E, so the average brightness will be 1.98Φ/E. It can be seen that the brightness of the combined light can be increased by combining the lights form a light emitting diode and a laser diode. Light combination can be achieved by multiple lighting devices arranged in a same direction and a same space; for example, a mixing packaged light source is disclosed in Chinese patent application number 200810065453.7, which providing a high brightness light source for projection display by using multiple LED and multiple LD to form a mixing array.

If the wavelengths of the two light emitting sources are different, another method, i.e. a wavelength-based coupling method can be used, which combines lights of light emitting sources from different directions by a dichroic filter. As shown in FIG. 1, in the light source using this light combining method, the light emitting sources have lights of two different wavelengths, which are respectively reflected and transmitted by the dichroic filter. Therefore, as shown in the Figure, a LED array 2 having a peak wavelength of 420 nanometer and a LED array 1 having a peak wavelength of 465 nanometer are located on two sides of the dichroic filter to be combined. In existing technologies this method is usually used to generate a mixed white light or color light. Suppose that the luminous flux of the LED array with peak wavelength of 420 nanometer is Φ, the etendue is E, so the average brightness is Φ/E; and suppose that the luminous flux of the LED array with peak wavelength of 465 nanometer is Φ, its etendue is E, so the average brightness is Φ/E. So after the two kinds of light emitting diodes are combined, the total luminous flux is 2Φ and the total etendue is E, so the average brightness is 2Φ/E. It can be seen that the two lights with non-overlapping spectra can be combined by the dichroic filter; the etendue of the combined light is the same as the etendue of one light, the average brightness is twice the average brightness of one light.

The first method described above can be used to mix lights of the same color, and can be used to mix lights of different colors as well, but a remarkable disadvantage of this method is that a parallel package of the light emitting diode and the laser diode is required, and the a high density array of the light emitting sources is required to guarantee the high brightness. Under high temperature the lifetime and reliability of laser diodes decay significantly, so usually a semiconductor cooler is needed to control the heat sink temperature of the laser diode. When a laser diode and a light emitting diode are packaged side by side, the temperature of the laser diode will increase, and to guarantee the lifetime and reliability of the laser diode, a semiconductor cooler must be provided for the whole light source, which significantly increases the cost and power consumption. Thus, this light combining method is not economical and not power efficient. Although the second method overcomes these disadvantages of the first method, it can only be used for combination of different color lights, and the dichroic filter increases the cost.

SUMMARY OF THE INVENTION

The main technical problems solved by the present invention is to overcome the disadvantages of the conventional art and to provide a light source and a light combining device thereof to form a high brightness combined light of the same or different color lights from different sources by a novel light combining method.

The technical scheme of the present invention provides a light source, comprising a first light emitting source and a second light emitting source, and a light combining device for combining lights from the first light emitting source and the second light emitting source into an output light along a first light path; in particular, the light combining device comprises a light guiding part for guiding the light from the second light emitting source into the first light path; the light guiding part blocking a part of the light from the first light emitting source from entering the first light path, and the luminous flux of the blocked part of the light is less than the luminous flux of the light from the first light emitting source that enters the first light path through the light combining device.

Specifically, in the above technical scheme, the luminous flux of the blocked part of the light from the first light emitting source is smaller than $1/5$ of the luminous flux of the light from the first light emitting source that enters the first light path through the light combining device. The etendue of the first light emitting source is larger than the etendue of the second light emitting source. And in particular, the first light emitting source comprises a light emitting diode, and the second light emitting source comprises a semiconductor laser.

The light combining device comprises a light transmitting device and at least one light reflecting device attached on the light transmitting device; the light from the first light emitting source is incident onto the light transmitting device from a first side and passes through a part of it that is other than the light reflecting device to enter the first light path; the light guiding part comprises the light reflecting device, a part of the light from the first light emitting source is prevented from entering the first light path by being reflected by the light reflecting device, and the light from the second light emitting source is incident onto the light reflecting device from a second side of the light transmitting device and is reflected by the light reflecting device into the first light path. The light transmitting device comprises a light transmitting board, and the light reflecting device attached on the light transmitting device comprises a light reflecting board, a reflecting plate, a reflecting mirror or a prism; or the light transmitting device comprises two prisms with their tilted surfaces adhered together, and the light reflecting device attached on the light transmitting device is the un-adhered part of the tilted surfaces of these two prisms.

Or the light combining device comprises a light reflecting device and at least one light transmitting device formed on the light reflecting device; the light from the first light emitting source is incident onto the light reflecting device from a first side and reflected by a part of it that is other than the light transmitting device to enter the first light path; the light guiding part comprises the light transmitting device, a part of the light from the first light emitting source is prevented from entering the first light path by passing through the light transmitting device, and the light from the second light emitting source is incident onto the light transmitting device from a second side of the light reflecting device and enters the first light path. The light reflecting device comprises a light reflecting board, a reflecting plate, or a reflecting mirror, and the light transmitting device comprises a through hole or a light transmitting hole on the light reflecting device; or the light reflecting device comprises a first prism, and the light transmitting device comprises a second prism with a tilted surface adhered to a part of the tilted surface of the first prism, and the second prism is smaller than the first prism.

Or the light combining device comprises a curved reflecting cup and at least one through hole or light transmitting hole formed on the reflecting cup; the light from the first light emitting source is incident onto the reflecting cup from a first side and reflected by a part of it that is other than the through hole or the light transmitting hole, to enter the first light path; the light guiding part comprises the through hole or light transmitting hole; a part of the light from the first light emitting source is prevented from entering the first light path by passing through the through hole or transmitting hole; and the light from the second light emitting source is incident into the through hole or transmitting hole from a second side of the reflecting cup and enters into the first light path. Wherein after transmitting through the through hole or light transmitting hole, the light of the second light emitting source is incident onto the light emitting surface of the first light emitting source and scattered by it to enter the first light path. When the light source also comprises a light collection part, the reflecting cup is semi-ellipsoid shaped, and the light emitting surface of the first light emitting source and the entrance of the light collection part are respectively located on the different focuses of the reflecting cup; or, the reflecting cup is semi-sphere shaped, and the light emitting surface of the first light emitting source and the entrance of the light collection part are respectively located at two symmetric points near the spherical center of the reflecting cup. Or when the light source also comprises a light collection part, the light of the second light emitting source is incident onto the entrance of the light collection part after transmitting through the through hole or light transmitting hole; wherein the reflecting cup is semi-ellipsoid shaped, the light emitting surface of the first light emitting source and the entrance of the light collection part are respectively located on the different focuses of the reflecting cup; or, the reflecting cup is semi-sphere shaped, the light emitting surface of the first light emitting source and the entrance of the light collection part are respectively located two symmetric points near the spherical center of the reflecting cup.

Or the light combining device comprises a light guiding device which is hollow inside with reflective side surfaces and at least one through hole or light transmitting hole formed on the side surfaces, and the light from the first light emitting source enters into the light guiding device from a first end thereof and is reflected by parts of the side surfaces that is other than the through hole or the light transmitting hole to a second end in order to enter the first light path; the light guiding part is the through hole or light transmitting hole; a part of light from the first light emitting source is prevented from entering the first light path by passing through the through hole or transmitting hole, and the light from the second light emitting source is incident on the side surfaces of the light guiding device through the through hole or transmitting hole and reflected by the side surfaces and propagates towards the second end of the light guiding device to enter the first light path.

Or the light combining device comprises a light guiding device with reflective side surfaces and at least one wedge shaped reflecting part formed on the side surfaces; the light from the first light emitting source is incident into the light guiding device from a first thereof end and reflected by parts of the side surfaces not taken by the wedge shaped reflecting part to a second end in order to enter the first light path; the light guiding part is the wedge shaped reflecting part; a part of light from the first light emitting source is prevented from entering the first light path by being reflected by the wedge shaped reflecting part; and the light from the second light emitting source is incident on the wedge shaped reflecting part and reflected by it to enter the inside of the light guiding device, and propagates towards the second end of the light guiding device to enter the first light path. Wherein the light guiding device is hollow inside, and the wedge shaped reflecting part is a solid wedge shaped reflecting part; or the light guiding device is a solid, and the wedge shaped reflecting part is a wedge shaped reflecting groove.

In the above technical schemes, the light guiding device is a light mixing rod.

The technical scheme of the present invention also provides a light source, comprising a first light emitting source and a second light emitting source, the lights from them are combined as an output light along a first light path, wherein the first light emitting source comprises a light emitting module constituted by multiple light emitting device arranged as an array, and the light emitting module comprises at least one through hole; the light from the second light emitting source is incident into the through hole from the opposite side of the light emitting surface of the light emitting module to enter the first light path; wherein the area of the through hole is smaller than that of the light emitting surface of the light emitting module. Specifically, the area of the through hole is smaller than $1/5$ of the area of the light emitting surface of the light emitting module. The light emitting devices of the first light emitting source comprises light emitting diodes, and the second light emitting source comprises a semiconductor laser or an array of semiconductor lasers.

The technical scheme of the present invention also provides a light source, in particular, the light emitting surface of the first light emitting source has a rough surface structure, and the light from the second light emitting source is incident onto the rough surface structure and scattered by it to enter the light path of the first light, thereby forming a first light path of the output light of the light source; a part of the light from the first light emitting source is prevented from entering the first light path by being blocked by the incident light path of the second light emitting source, and the luminous flux of the blocked part of the light is less than the luminous flux of the light from the first light emitting source that enters the first light path. Specifically, the etendue of the second light emitting source is smaller than $1/5$ of the etendue of the first light emitting source. The first light emitting source comprises a light emitting diode, and the second light emitting source comprises a semiconductor laser. Furthermore, there is a reflecting device in the incident light path of the second light emitting source for reflecting the light of the second light emitting source to the rough surface structure of the first light emitting source; a part of light from the first light emitting source is prevented from entering into the first light path by being reflected by the reflecting device, and the luminous flux of the reflected part of the light is smaller than $1/5$ of the luminous flux of the light from the first light emitting source that enters the first light path. When the light source comprises a light collection part, the light emitting surface of the first light emitting source is located at the entrance of the light collection part.

In the above technical schemes, the lights from the first light emitting source and the second light emitting source have the same color.

Furthermore the technical scheme of the present invention also provides a light combining device, for guiding a first incident light and a second incident light from different incident angles and combining them into an output light along a first light path; in particular, the light combining device comprises a light guiding part, for guiding the second incident light to enter the first light path, and for preventing a part of the first incident light from entering the first light path, and the luminous flux of the prevented part of light is smaller than the luminous flux of the light from the first incident light that enters the first light path. Specifically, the luminous flux of the prevented part of the light is smaller than $1/5$ of the luminous flux of the light from the first incident light that enters the first light path.

Specifically, the light combining device comprises a light transmitting device and at least one light reflecting device attached on the light transmitting device used as the light guiding part, and the first incident light is incident onto the light transmitting device and passes through a part of it that is other than the light reflecting device to enter the first light path. Or the light combining device comprises a light reflecting device and at least one light transmitting device formed on the light reflecting device used as the light guiding part, and the first incident light is incident onto the light reflecting device and reflected by the a part of it that is other than the light transmitting device to enter the first light path. Or the light combining device comprises a curved reflecting cup and at least one through hole or light transmitting hole formed on the reflecting cup used as the light guiding part, and the first incident light is incident onto the reflecting cup and reflected by a part of it that is other than the through hole or the light transmitting hole to enter the first light path. Or the light combining device comprises a light guiding device which is hollow inside with reflective side surfaces and at least one through hole or light transmitting hole formed on the side surfaces, and the first incident light is incident into the light guiding device from a first end and reflected by a part of the side surfaces that is other than the through hole or the light transmitting hole to a second end. Or the light combining device comprises a light guiding device with reflective side surfaces and at least one wedge shaped reflecting part formed on the side surfaces used as the light guiding part, and the first incident light is incident into the light guiding device from a first end and reflected by a part of the side surfaces that is other than the wedge shaped reflecting part to a second end in order to enter into the first light path.

The technical scheme of the present invention also provides a projection device, in particular a projection device comprising the light source mentioned above.

Compared with the case using dichroic filter, combining light using a geometric manner has the advantages that the light path is simple and the optical components are easy to fabricate. In particular, it can combine lights of the same color to achieve high brightness light with reduced cost; and when lights of different colors or different dominant wavelengths are combined, more color tuning freedom can be further achieved for the combined light by controlling the brightness of different color lights. Moreover, the heat dissipation of the light source is ensured in the technical schemes mentioned above.

DETAILED DESCRIPTION OF THE PREFERRED EMBODIMENTS

Preferred embodiments of the present invention are described in detail with reference to the Figures.

Figure 1:
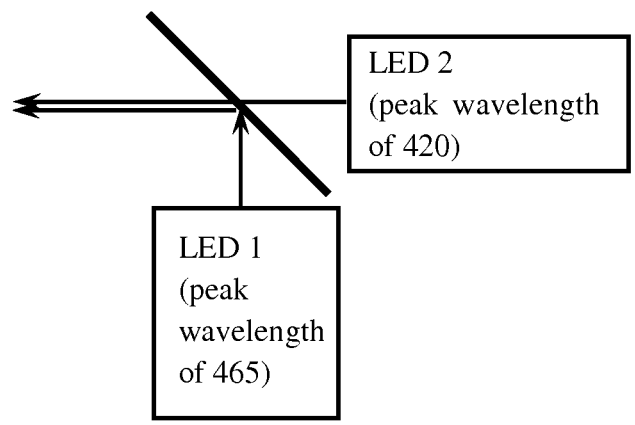
FIG. 1 is a schematic view of a conventional wavelength coupling method for combining lights.
Figure 2:
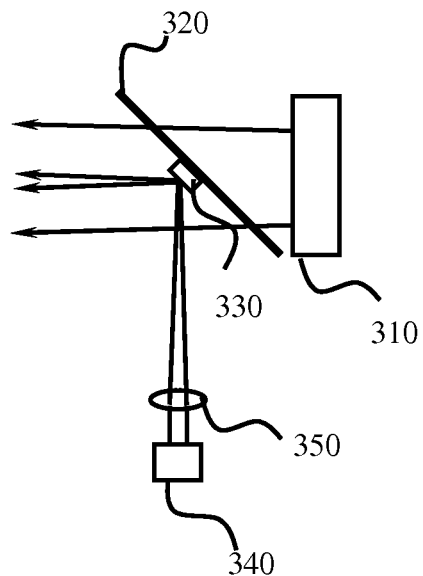
FIG. 2 is a schematic view of an embodiment of the light source of the present invention.

To solve the technical problems mentioned above, the basic idea of the present invention is: to employ two independent light emitting sources with different brightness and independent package, power supply and heat dissipation system; and to combine the light beams from the two light emitting sources in an optical manner to achieve a combined light whose brightness is higher than the brightness of one the two light emitting sources that has the lower brightness. Because it does not require the spectra of the two light emitting sources to be non-overlapping, and to reduce the cost of light combination, a dichroic filter is not used. To achieve the goal of the present invention, a light combining device that has different optical parameters for different light emitting source is added between the two light emitting sources. Clearly, the simplest light combining device is a transmitting plate or reflecting plate with certain treatments, namely a transmitting plate with partial light reflection or a reflecting plate with partial light transmission accomplished by separating light in a geometric manner. In theory, the light beams of the two light emitting sources can be combined perfectly, where the luminous flux of the combined light is the sum of the luminous fluxes of the two light emitting sources and the etendue of the combined light is the sum of the etendue of the two light emitting sources. But in practice, the light beams from the two light emitting sources are hard to be combined perfectly because the edges of the light beams cannot be very sharp. Also, the light beams of the two light emitting sources are usually round-shaped or ellipse-shaped which cannot be combined perfectly. In the present invention, considering the importance of the shape and uniformity of the light beam from the light source for downstream application, by making use of the etendue difference between the two light emitting sources, most of light from the light emitting source with larger etendue and all of light from the light emitting source with smaller etendue are combined by a light combining device. While a small amount of the light from the light emitting source with larger etendue is sacrificed, the light from the light emitting source with smaller etendue (the high brightness light emitting source) is fully utilized to achieve a total luminous flux of the combined light that is smaller but close to the sum of the luminous fluxes of the two light emitting sources. The shape of the combined light is identical to that of the light emitting source with larger etendue; as shown in FIG. 2, the light from the light emitting source with smaller etendue (high brightness light emitting source such as laser diode) is combined into the light beam generated by the light emitting source with larger etendue. The etendue of the combined light is therefore similar to the etendue of the light emitting source with larger etendue.

Using the etendue concept mentioned above, and assuming the two light emitting sources are a light emitting diode and a laser diode, where the luminous flux of the light emitting diode is $\Phi$, its etendue is E, and its average brightness is $\Phi/E$; and where the luminous flux of the laser diode is $\Phi$ too, its etendue is 0.01E, and its average brightness is $100\Phi/E$. By making use of the light combining device of the present invention, if the brightness of the light emitting diode is uniform, only 1% of the luminous flux of the light emitting diode will be sacrificed and the luminous flux of the laser diode $\Phi$ is fully conserved. Therefore the total luminous flux of the combined light is $1.99\Phi$ with an etendue of E, so the average brightness will be $1.99\Phi/E$.

A key point of the light source in the present invention is to combine lights with a light combining device by making use of the different light distribution in space. The light source includes two light emitting sources 310, 340, which can include lighting devices, such as but not limited to semiconductor laser (LD) or light emitting diode (LED) which have good prospect in display and lighting industry. The two light emitting sources can also includes light emitting modules constituted by multiple lighting devices arranged as arrays. The light combining device is used for guiding the two incident lights coming from different incident angles and combining them as an output light emitting along a first light path. The light combining device in the present invention also comprises a light guiding part which guides the second incident light (such as the light from the second light emitting source) into the first light path; meanwhile the light guiding part also blocks a part of light from the first light emitting source from entering the first light path, and the luminous flux of the blocked part of light is less than the luminous flux of light from the first light emitting source entering the first light path.

Referring to FIG. 2, FIG. 2 is a schematic view of an embodiment of the light source of the present invention. In the present embodiment, the light source includes a first light emitting source 310, a second light emitting source 340, a light transmitting device 320 and a light reflecting device 330 attached on the light transmitting device 320 used as the light guiding part. The light from the first light emitting source 310 is incident onto the light transmitting device 320 from a first side and passes through a part of it that is other than the light reflecting device 330 (referred to as effective light transmitting region) to enter the first light path, and the light from the second light emitting source 340 is incident onto the light reflecting device 330 from a second side of the light transmitting device 320 and reflected by the light reflecting device 330 to enter the first light path. In the present embodiment, a part of the light from the first light emitting source 310 is prevented from entering the first light path by being reflected by the light reflecting device 330. A key point is that, the smaller the ratio of the blocked area by the light guiding part to the un-blocked area for to the first incident light, in other words the larger the ratio of the effective light transmitting region of the light transmitting device 320 to the area of the light reflecting device 330, the smaller the ratio of the light loss of the first light emitting source 310 due to reflection by the light reflecting device 330 and the higher the light combining performance. Test shows that the blocking area should be smaller than ⅕ of the un-blocking area, and the specific value can be determined based on the etendue of the second light emitting source. Correspondingly, the luminous flux of the blocked light of the first light emitting source 310 due to reflection by the light reflecting device 330 is smaller than ⅕ of the luminous flux of light from the first light emitting source 310 that enters the first light path. Usually the etendue of LED is large and the etendue of LD is small. By making the etendue of the first light emitting source larger than the etendue of the second light emitting source, e.g. in the present embodiment the first light emitting source 310 is LED source and the second light emitting source 340 is LD source, then the area of the light reflecting device 330 can be as smaller as possible. Further, the light source shown in FIG. 2 also includes an optical device 350, for modifying the divergence angle of the LD source to be close to that of the LED source so that the area of the light reflecting device 330 can be significantly reduced to improve the light combining performance.

In the embodiment shown in FIG. 2, the light combining device includes a light transmitting device 320 and a light reflecting device 330 attached on the light transmitting device 320 used as the light guiding part. The light from the first light emitting source 310 (the first incident light) is incident onto the light transmitting device 320 from a first side and passes through a part of it that is other than the light reflecting device 330 to enter the first light path. The light from the second light emitting source 340 (the second incident light) is incident onto the light reflecting device 330 from a second side of the light transmitting device 320 and reflected by the light reflecting device to enter the first light path.

Specifically, the light transmitting device 320 can be a light transmitting board, such as but not limited to a glass board or plastic board with anti-reflectance coating on two surfaces. The light reflecting device 330 includes a light reflecting board, a reflecting plate or a reflecting mirror, such as but not limited to a glass plate or plastic plate with high reflectance coating. To eliminate the coherence of the LD light, rough structures can be provided on the reflecting surface of the light reflecting device 330.

Figure 3:
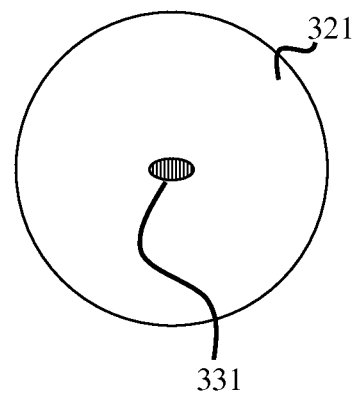
FIG. 3 illustrates the cross section of the combined light beam of FIG. 2.

Referring to FIG. 3, FIG. 3 illustrates the cross section of the combined light beam of FIG. 2. The light spot 321 is generated by light of the first light emitting source transmitting through the light transmitting device 320, and the light spot 331 is generated by light of the second light emitting source 340 reflecting by the light reflecting device 330. The larger the area ratio of the spot 321 to the spot 331, the better; therefore, the larger the area ratio of the light transmitting device 320 to the light reflecting device 330, the better. In practice, the first light emitting source 310 can be a LED module including multiple LEDs, and the second light emitting source 340 can be a LD module including multiple LDs; correspondingly, multiple light reflecting devices 330 should be attached on the light transmitting device 320.

Figure 4:
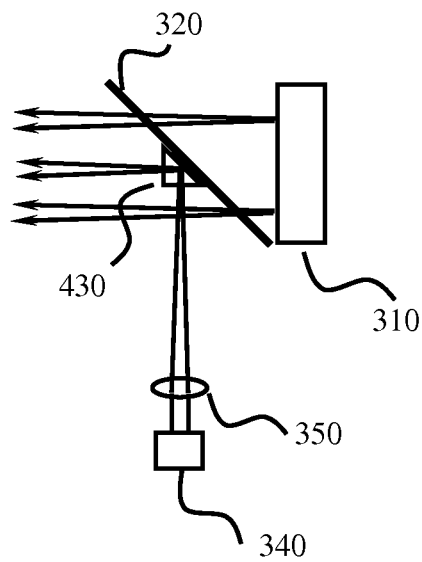
FIG. 4 is a schematic view of an alternative embodiment of the light source of the present invention.

Referring to FIG. 4, FIG. 4 is a schematic view of an alternative embodiment of the light source of the present invention. A difference between the present embodiment and the embodiment of FIG. 2 is that the light reflecting device is prism 430. The prism 430 can reflect lights by total internal reflecting, and the reflecting efficiency is higher. A tilted surface of the prism 430 is disposed on the light transmitting device 320, and there can be (but not required) an air gap between the tilted surface and the light transmitting device 320 to ensure the total internal reflectance condition of the prism 430. A rough structure can be set on any right-angle surface of the prism 430 to eliminate the coherence of the LD light. Furthermore, a reflecting coating can be coated on the tilted surface of prism 430 to ensure reflection of the light of the second light emitting source 340.

Figure 5:
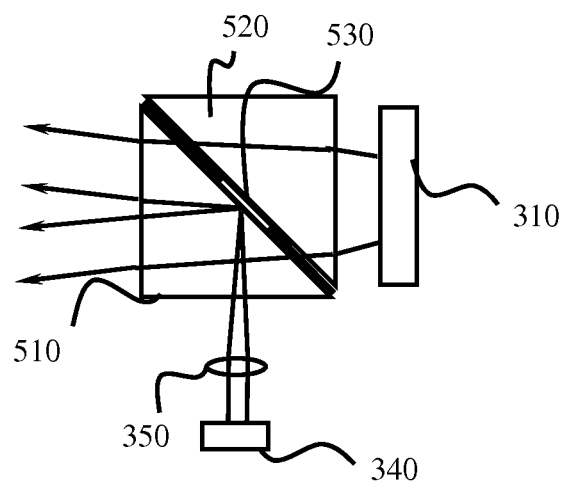
FIG. 5 is a schematic view of an alternative embodiment of the light source of the present invention.

Referring to FIG. 5, FIG. 5 is a schematic view of an alternative embodiment of the light source of the present invention. Some differences between the present embodiment and the embodiment of FIG. 4 include: the light transmitting device comprises two prisms 510, 520 with their tilted surfaces adhered to each other, and the light reflecting device is an un-adhered part of the tilted surface (reflecting region 530) of these two prisms, and the reflecting region 530 is used as the light guiding part. Specifically, the two prisms 510 and 520 are adhered together on the part outside the reflecting region 530 by an adhesive (in order to destroy the total internal reflectance of this part), while in the reflecting region 530 an air gap is maintained or a high reflectance coating is coated. Therefore, most of the light from the first light emitting source 310 can pass through the two prisms 510 and 520, and the light from the second light emitting source 340 is reflected by the reflecting region 530. In the same manner a rough structure can be provided on the right-angle surface of the prism 510 facing the second light emitting source 340, especially when the second light emitting source 340 is an LD source.

In the embodiments mentioned above, the light from the LD source with small etendue is used virtually without loss, and the light loss of the LED source with large etendue caused by the light guiding part can be omitted, so the combined brightness of the light source is increased. Because currently the brightness of the LED sources is much lower than that of the LD sources, but the price of LED sources is also much lower than that of LD with same color, the present invention is especially suitable for combining lights from two light emitting sources with the same color. The brightness of the hybrid light source of the present invention is higher than the brightness of light source only using LED, and meanwhile the price is lower than that of light sources only using LD. Unless otherwise stated, this mixing characteristic (combining and mixing of lights with the same color from first and second light emitting sources) is applicable to other embodiments of the light source of the present invention.

Figure 6:
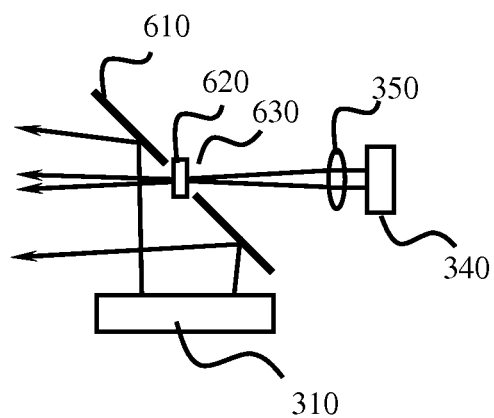
FIG. 6 is a schematic view of an alternative embodiment of the light source of the present invention.

Referring to FIG. 6, FIG. 6 is a schematic view of an alternative embodiment of the light source of the present invention. In the present embodiment, the light source includes a first light emitting source 310, a second light emitting source 320, a light reflecting device 610 and a light transmitting device 630 formed on the light reflecting device 610 used as light guiding part. The light from the first light emitting source (the first incident light) is incident onto the light reflecting device from a first side and reflected by a part of it that is other than the light transmitting device (the effective light reflecting region) to enter the first light path. A part of the light from the first light emitting source 310 is prevented from entering the first light path by passing through the light transmitting device 630, and the light from the second light emitting source 340 is incident onto the light transmitting device 630 from a second side of the light reflecting device 610 and enters the first light path. Similar to the embodiment of FIG. 2, a key point is that, the smeller the ratio of the non-reflecting area which acts as the light guiding part to the reflecting area through which the first incident light enters the first light path, in other words the larger the ratio of the effective light reflecting region of the light reflecting device 610 to the area of the light transmitting device 630, the smaller the ratio of the light loss of the first light emitting source 310 and the higher the light combining performance. Similarly, the non-reflecting area should be smaller than ⅕ of the reflecting area, and the specific value can be determined based on the etendue of the second light emitting source. An optical device 350 is used for modifying the divergence angle of the second light emitting source 340 to be close to that of the first light emitting source 310 so that the light transmitting area of the light transmitting device 630 can be significantly reduced.

Specifically, the light reflecting device 610 includes a light reflecting board, a reflecting plate or a reflecting mirror, such as but not limited to a glass plate or plastic plate with high reflectance coating, even a metal plate. The light transmitting device 630 includes a through hole or a light transmitting hole on the light reflecting device 610, and even includes a transmitting-type diffuser 620 located in the through hole of the light reflecting device 610. The transmitting-type diffuser 620 can be set to be stationary or moveable to eliminate the coherence of the light of the second light emitting source 340 (such as LD source).

When the second light emitting source 340 is a LD module including multiple LDs, multiple light transmitting devices can be similarly attached correspondingly on the light reflecting device 610.

In the embodiment of FIG. 6 the light combining device includes a light reflecting device 610 and a light transmitting device 630 formed on the light reflecting device 610 used as light guiding part. The first incident light is incident onto the light reflecting device 610 from a first side and reflected by a part of it that is other than the light transmitting device 630 to enter the first light path. The second incident light is incident onto the light transmitting device 630 from a second side of the light reflecting device 610 and enters the first light path.

Figure 7:
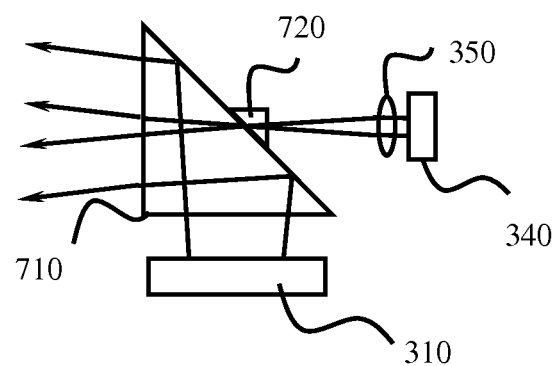
FIG. 7 is a schematic view of an alternative embodiment of the light source of the present invention.

Referring to FIG. 7, FIG. 7 is a schematic view of an alternative embodiment of the light source of the present invention. Some differences between the present embodiment and the embodiment of FIG. 6 include: the light reflecting device is a first prism 710, and the light transmitting device includes a second prism 720 with a tilted surface adhered to a part of the tilted surface of the first prism 710. The second prism 720 is smaller than the first prism 710. The tilted surface of the first prism 710 is used to reflect lights by total internal reflectance which provides high light reflecting efficiency. The tilted surfaces of the two prisms 720 and 710 are adhered together tightly to destroy the total internal reflectance condition in the adhered region, so that the light from the second light emitting source 340 can pass through the adhered region. In the same manner a rough structure can be provided on the right-angle surface of the prism 720 facing the incident light to eliminate the coherence of the incident light. If a high reflectance coating is coated on the part of the tilted surface of the first prism 710 outside the cemented region, the light reflecting effect can be enhanced.

Figure 8:
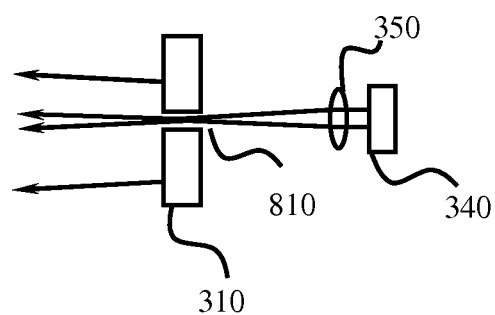
FIG. 8 is a schematic view of an alternative embodiment of the light source of the present invention.

Referring to FIG. 8, FIG. 8 is a schematic view of an alternative embodiment of the light source of the present invention. The first light emitting source 310 includes a light emitting module constituted by multiple lighting devices arranged as an array, and the light emitting module includes at least one through hole 810 (only one through hole is shown in the Figure). The light from the second light emitting source 340 is incident into the through hole 810 from the side of the light emitting module opposite the light emitting surface to enter the first light path; wherein the area of the through hole 810 is smaller than that of the light emitting surface of the light emitting module. Preferably the area of the through hole is smaller than 1/5 of the area of the light emitting surface of the light emitting module. Similarly an optical device 350 is used modifying the divergence angle of the second light emitting source 340 to be close to that of the first light emitting source 310 so that the aperture of the through hole 810 can be significantly reduced. In the present embodiment the lighting device of the first light emitting source can include a light emitting diode, and the second light emitting source includes a semiconductor laser or an array of semiconductor lasers. Compared to the technical scheme disclosed by Chinese patent application number 200810065453.7, the advantage of the present embodiment is that, the heat dissipations of the light emitting module of the first light emitting source and the light emitting module of the second light emitting source are independent, and the etendue of the combined light is controlled.

Figure 9:
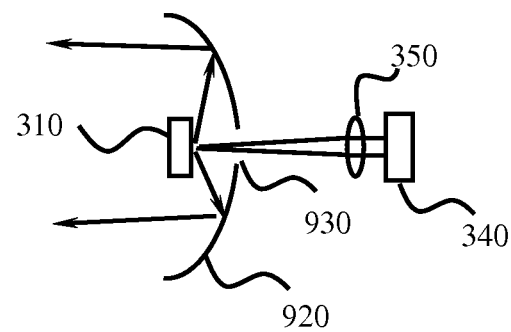
FIG. 9 is a schematic view of an alternative embodiment of the light source of the present invention.

Referring to FIG. 9, FIG. 9 is a schematic view of an alternative embodiment of the light source of the present invention. The light combining device includes a curved reflecting cup 920 and one or more than one (only one is shown in the Figure) through hole 930 formed on the reflecting cup 920 used as the light guiding part. The light from the first light emitting source 310 (the first incident light) is incident onto the reflecting cup 920 from a first side and reflected by a part of it that is other than outside the through hole 930 to enter the first light path. A part of light from the first light emitting source 310 is prevented from entering the first light path by passing through the through hole 930, and the light from the second light emitting source 340 is incident into the through hole 930 from a second side of the reflecting cup 920 and incident onto the surface of the first light emitting source 310. A rough structure is provided on the surface of the first light emitting source 310 for scattering the light from the second light emitting source 340. A part of the scattered light is reflected by the reflecting cup 920 into light path through, and a part of the scattered light is reflected back to the first light emitting source 310 and then re-emitted again through photon recycle effect and then collected by the reflecting cup 920 to enter the first light path. The through hole 930 can be replaced by a light transmitting hole formed by removing the high reflectance coating on the reflecting cup 920, and it is not described further. Similar to the embodiments of FIG. 2 or FIG. 6, a key point of the light source or light combining device is that, the smaller the ratio of the non-reflecting area which acts as the light guiding part to the reflecting area through which the first incident light enters the first light path, in other words the larger the ratio of the effective light reflecting region of the curved reflecting cup 920 to the area of the through hole or light transmitting hole 930, the higher the light combining efficiency. So similarly the non-reflecting area should be smaller than 1/5 of the reflecting area, so that the luminous flux of the lost part of the light is smaller than 1/5 of the light of the first light emitting source 310 that enters the first light path. Similarly an optical device 350 is used for modifying the divergence angle of the second light emitting source 340 so that the aperture of the through hole 930 can be significantly reduced.

Figure 10:
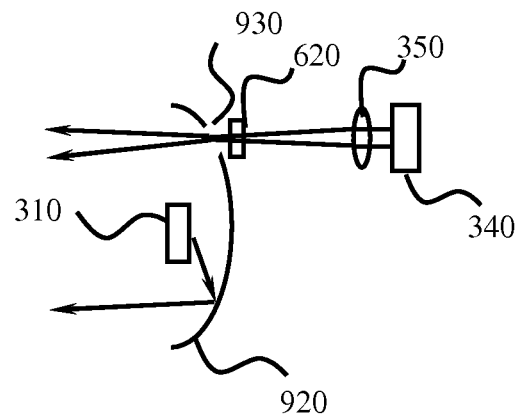
FIG. 10 is a schematic view of an alternative embodiment of the light source of the present invention.

Referring to FIG. 10, FIG. 10 is a schematic view of an alternative embodiment of the light source of the present invention. FIG. 10 illustrates an alternative embodiment of FIG. 9. In the present embodiment, after passing through the through hole 930, the light of the second light emitting source 340 is incident onto a light collection part of the light source and is combined with the light from the first light emitting source 310 which has been reflected by the reflecting cup 920 into the first light path. In the same manner a transmitting-type diffuser 620 located in the through hole 930 is used to eliminate the light coherence of the second light emitting source (such as LD) 340. The transmitting-type diffuser 620 can be stationary or moveable relative to the through hole 930. Moreover, compared with the embodiment of FIG. 9, in the present embodiment, the light of the second light emitting source 340 is not guided to the light emitting surface of the first light emitting source 310, and the location of the through hole 930 is offset towards an edge of the reflection cup 920.

Figure 11:
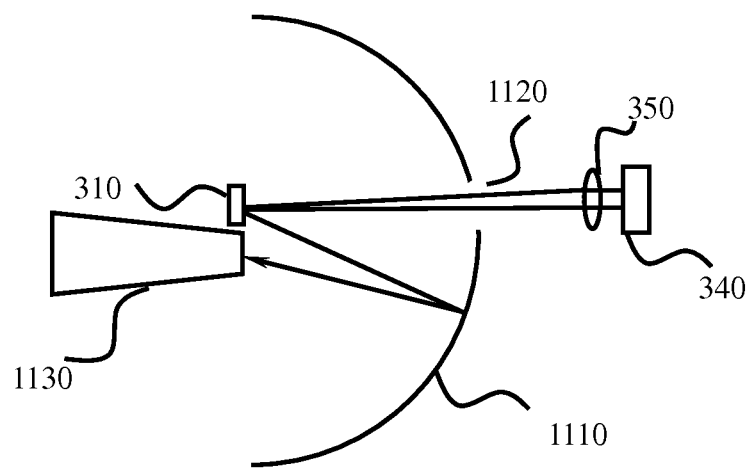
FIG. 11 is a schematic view of an alternative embodiment of the light source of the present invention.

Referring to FIG. 11, FIG. 11 is a schematic view of an alternative embodiment of the light source of the present invention. FIG. 11 illustrates an improved embodiment of the light source of FIG. 9. The embodiment of FIG. 11 further includes a light collection part 1130, and the reflecting cup is for example but not limited to a semi-ellipsoid shaped or a semi-sphere shaped reflector 1110. The light guiding part is a through hole 1120 located on the reflector 1110. When the reflecting cup is semi-ellipsoid shaped, the light emitting surface of the first light emitting source 310 and the entrance of the light collection part 1130 are respectively located on the different focuses of the reflecting cup. When the reflecting cup is semi-sphere shaped, the light emitting surface of the first light emitting source 310 and the entrance of the light collection part 1130 are respectively located on two symmetric points with respect to the spherical center of the reflecting cup. The light from the first light emitting source is guided by the semi-sphere shaped or semi-ellipsoid shaped reflector to the entrance of the light collection part 1130, and a part of light from the first light emitting source 310 is lost by passing the through hole 1120. Other parts of the present embodiment are the same as in the embodiment of FIG. 9 and are not described here.

Figure 12:
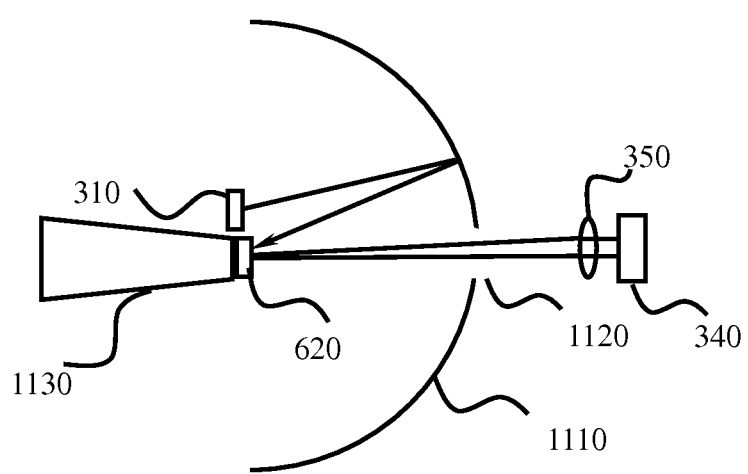
FIG. 12 is a schematic view of an alternative embodiment of the light source of the present invention.

Referring to FIG. 12, FIG. 12 is a schematic view of an alternative embodiment of the light source of the present invention. FIG. 12 illustrates an improved embodiment of the light source of FIG. 10 similar to the improvement in FIG. 11. Similarly a light collection part 1130 is added, and the reflecting cup is for example but not limited to a semi-ellipsoid shaped or a semi-sphere shaped reflector 1110. The light guiding part is a through hole 1120 located on the reflector 1110. A difference between the present embodiment and the improved embodiment of FIG. 11 is that, in the present embodiment, after passing through the through hole 1120 or light transmitting hole, the light of the second light emitting source 340 is incident directly onto the entrance of the light collection part 1130 rather than onto the light emitting surface of the first light emitting source 340. Moreover, as shown in the Figure, the present embodiment also includes a stationary or moveable transmitting-type diffuser 620 located at the entrance of the light collection part 1130 for eliminating the coherence of light (especially LD light). Other structures similar to the embodiment of FIG. 11 are not described here.

Figure 13:
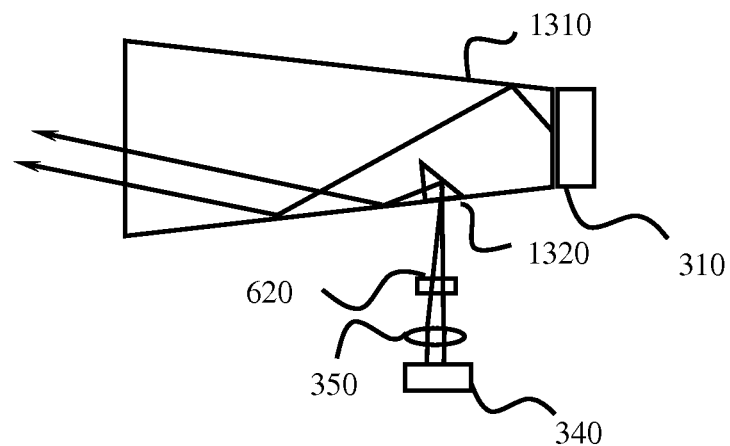
FIG. 13 is a schematic view of an alternative embodiment of the light source of the present invention.

Referring to FIG. 13, FIG. 13 is a schematic view of an alternative embodiment of the light source of the present invention. In the present embodiment, the light combining device includes a light guiding device 1310 with reflective side surfaces and at least one wedge shaped reflecting part 1320 formed on the side surfaces used as the light guiding part. The light from the first light emitting source 310 (the first incident light) is incident into the light guiding device 1310 from a first end and reflected by parts of the side surface other than the wedge shaped reflecting part 1320 to a second end to enter the first light path. A part of light from the first light emitting source 310 is prevented from entering the first light path by being reflected by the wedge shaped reflecting part 1320. The light from the second light emitting source 340 is incident on the wedge shaped reflecting part 1320 and reflected by it to enter the inside of the light guiding device 1310 and propagates towards the second end of the light guiding device 1310 to enter the first light path. A stationary or movable diffuser 620 and an optical device 350 are located in the light path between the second light emitting source 340 and the wedge shaped reflecting part 1320; their functions are described in the embodiments mentioned above and not repeated here.

Similar to the embodiments of FIG. 2, FIG. 6 or FIG. 9, a key point of the light source or light combining device of the present embodiment is that, the smaller the ratio of the non-effective area (i.e. area not effective for guiding the first incident light into the first light path) to the effective area, in other words the smaller the ratio of the area of wedge shaped reflecting part 1320 inside the light guiding device 1310 to the area of the cross section of the light guiding device 1310, the higher the light combining performance. Similarly, the non-effective area should be smaller than ⅕ of the effective area, and the specific value can be determined based on the etendue of the second light emitting source.

In the present embodiment, the light guiding device 1310 can be hollow inside, and the wedge shaped reflecting part 1320 is a solid wedge shaped reflecting part. The light guiding device 1310 can also be solid, and the wedge shaped reflecting part 1320 is a wedge shaped reflecting groove, such as but not limited to a groove with a high reflectance coating on the tilted surfaces. Moreover, the light guiding device is for example but not limited to a light mixing rod.

Figure 14:
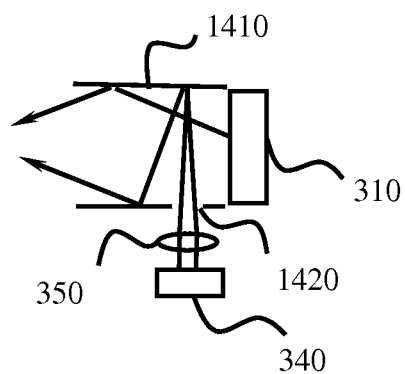
FIG. 14 is a schematic view of an alternative embodiment of the light source of the present invention.

Referring to FIG. 14, FIG. 14 is a schematic view of an alternative embodiment of the light source of the present invention. The FIG. 14 illustrates an alternative embodiment of FIG. 13. The light combining device is replaced by a light guiding device 1410 which is hollow inside with reflective side surfaces and at least one through hole or light transmitting hole 1420 formed on the side surfaces used as the light guiding part. The light guiding device is for example but not limited to a hollow mixing rod or a light collection cavity with high diffusion coating on its inside surface. The light from the first light emitting source 310 (the first incident light) is incident into the light guiding device 1410 from a first end and reflected by parts of the side surface that is other than the through hole or the light transmitting hole 1420 to a second end of the light guiding device 1410 to enter into the first light path. A part of light from the first light emitting source 310 is prevented from entering the first light path by passing through the through hole or transmitting hole, and the light from the second light emitting source 340 is incident on the side surfaces of the light guiding device 1410 through the through hole or transmitting hole 1420 and reflected by the side surfaces and propagates towards the second end of the light guiding device 1410 to enter the first light path. Similarly the smaller the ratio of the non-effective area to the effective area, in other words the smaller the ratio of the area of the through hole or light transmitting hole 1420 to the area of the side surfaces, the higher the light combining performance. The light emitting surface of the first light emitting source 310 can be in contact with the first end, and a reflecting device (not shown in the Figure) can be disposed inside the light guiding device 1410 opposite the through hole or light transmitting hole 1420 to improve the reflecting effect of the second light path. A optical device 350 is located in the light path between the second light emitting source 340 and the through hole or light transmitting hole 1420; its functions are described in the embodiments mentioned above and are not repeated here.

Figure 15:
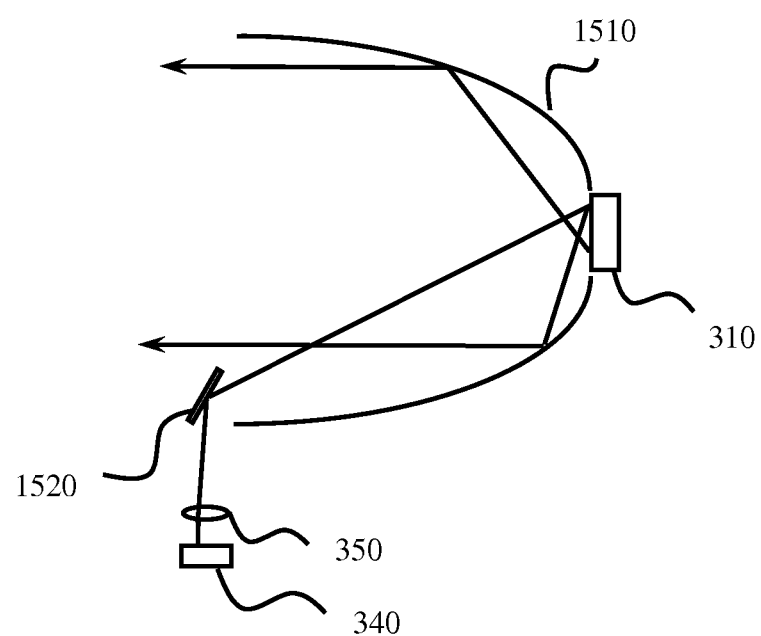
FIG. 15 is a schematic view of an alternative embodiment of the light source of the present invention.

Referring to FIG. 15, FIG. 15 is a schematic view of an alternative embodiment of the light source of the present invention. In the present embodiment the second light emitting source 340 includes a semiconductor laser, and the first light emitting source 310 includes a light emitting diode. The light emitting surface of the first light emitting source includes a rough surface structure, and the light from the second light emitting source 340 is incident onto the rough surface structure and scattered by it to enter the light path of the first light emitting source 310 which forms the first light path of the output light of the light source. A part of light from the first light emitting source 310 is prevented from entering the first light path by the incident light path of the second light emitting source 340, and the luminous flux of the lost light is less than the luminous flux of light from the first light emitting source 310 that enters the first light path. Similarly an optical device 350 for modifying the divergence angle of the second light emitting source 340 can (but is not limited to) guide light from the second light emitting source to converge onto the rough surface structure.

In embodiment of FIG. 15, a reflecting device 1520 is disposed in the incident light path of the second light emitting source 340 for reflecting the light of the second light emitting source 340 to the rough surface structure of the first light emitting source 310. A part of the light from the first light emitting source 310 is prevented from entering the first light path by being reflected by the reflecting device 1520, and the luminous flux of the lost light is smaller than ⅕ of the luminous flux of light from the first light emitting source 310 that enters the first light path. To achieve a better light combining effect, the etendue of the second light emitting source 340 should be smaller than ⅕ of the etendue of the first light emitting source 310. Also as shown in FIG. 15, in the present embodiment a light collection part 1510 can be provided, and the light emitting surface of the first light emitting source 310 is located on the entrance of the light collection part 1510 to increase the portion of light of the first light emitting source 310 that enters the first light path as much as possible.

A projection device employing the embodiments of the light sources mentioned above is also protected by the present invention, especially one of the two light emitting sources includes a light emitting diode array and the other includes a semiconductor laser array.

The described above are only embodiments of the present invention and don't limit the protection scope of the present invention, all equivalent structures or processes based on the description and figures of the present invention, or directly or indirectly used in other related technical field, are protected by the present invention in the same manner.

What is claimed is:

1. A light source, comprising:
a first light emitting source having a first etendue;
a second light emitting source having a second etendue which is smaller than ⅕ of the first etendue of the first light emitting source;
wherein the first light emitting source comprises a light emitting diode, and the second light emitting source comprises a semiconductor laser; and
a light combining device for combining lights from the first light emitting source and the second light emitting source as an output light along in a first light path, wherein:
the light combining device comprises a first light guiding part for guiding a light from the first light emitting source into the first light path, and a second light guiding part for guiding a light from the second light emitting source into the first light path; the second light guiding part also preventing a part of the light from the first light emitting source from entering the first light path, and wherein a luminous flux of the prevented part of light is less than a luminous flux of the light from the first light emitting source that enters the first light path through the light combining device,
wherein the first light guiding part of the light combining device comprises a curved reflecting cup and the second light guiding part is at least one through hole or light transmitting hole formed on the curved reflecting cup, wherein the light from the first light emitting source is incident onto the reflecting cup from a first side and reflected by a part of other than the through hole or the light transmitting hole to enter the first light path; wherein the second light guiding part comprises the through hole or light transmitting hole, wherein a part of light from the first light emitting source is prevented from entering the first light path by passing through the through hole or transmitting hole, and wherein the light from the second light emitting source is incident into the through hole or transmitting hole from a second side of the reflecting cup and enters the first light path.

2. The light source of claim 1, wherein after passing through the through hole or light transmitting hole, the light of the second light emitting source is incident onto a light emitting surface of the first light emitting source and scattered by the light emitting surface to enter the first light path.

3. The light source of claim 2, further comprising a light collection part, wherein the curved reflecting cup is semi-ellipsoid shaped, and the light emitting surface of the first light emitting source and an entrance of the light collection part are respectively located on different focuses of the curved reflecting cup; or, the curved reflecting cup is semi-sphere shaped, and the light emitting surface of the first light emitting source and the entrance of the light collection part are respectively located on two symmetrical points near the spherical center of the curved reflecting cup.

4. The light source of claim 1, further comprising a light collection part, wherein after passing through the through hole or light transmitting hole, the light of the second light emitting source is incident onto an entrance of the light collection part; wherein the curved reflecting cup is semi-ellipsoid shaped, and the light emitting surface of the first light emitting source and the entrance of the light collection part are respectively located on different focuses of the curved reflecting cup; or, the curved reflecting cup is semi-sphere shaped, the light emitting surface of the first light emitting source and the entrance of the light collection part are respectively located on two symmetrical points near the spherical center of the curved reflecting cup.

5. A projection device, comprising the light source of claim 1.

6. A light source, comprising:
a first light emitting source having a first etendue;
a second light emitting source having a second etendue which is smaller than ⅕ of the first etendue of the first light emitting source;
wherein the first light emitting source comprises a light emitting diode, and the second light emitting source comprises a semiconductor laser; and
a light combining device, having a first light guiding part and a second light guiding part, for combining lights from the first light emitting source and the second light emitting source as an output light along in a first light path,
wherein a light emitting surface of the first light emitting source has a rough surface structure, and a light from the second light emitting source is guided by the second light guiding part to incident onto the rough surface structure and scattered by the rough surface structure, wherein a light emitted by the first light emitting source and the scattered light of the second light emitting source are guided by the first light guiding part to a first light path of an output light of the light source; wherein a part of the light from the first light emitting source is prevented from entering the first light path by the second light guiding part, and wherein a luminous flux of the prevented part of the light is less than a luminous flux of the light from the first light emitting source that enters the first light path.

7. The light source of claim 6, wherein the second light guiding part comprises a reflecting device in the incident light path of the second light emitting source for reflecting the light of the second light emitting source to the rough surface structure of the first light emitting source; wherein a part of the light from the first light emitting source is prevented from entering the first light path by being reflected by the reflecting device, and wherein a luminous flux of the prevented part of the light is smaller than $\frac{1}{5}$ of a luminous flux of the light from the first light emitting source that enters the first light path.

8. The light source of claim 6, further comprising a light collection part, wherein the light emitting surface of the first light emitting source is located at an entrance of the light collection part.

9. A light source, comprising:
a first light emitting source having a first etendue;
a second light emitting source having a second etendue which is smaller than $\frac{1}{5}$ of the first etendue of the first light emitting source;
wherein lights from the first light emitting source and the second light emitting source have the same color; and
a light combining device, having a first light guiding part and a second light guiding part, for combining the lights from the first light emitting source and the second light emitting source as an output light along in a first light path,
wherein a light emitting surface of the first light emitting source has a rough surface structure, and a light from the second light emitting source is guided by the second light guiding part to incident onto the rough surface structure and scattered by the rough surface structure, wherein a light emitted by the first light emitting source and the scattered light of the second light emitting source are guided by the first light guiding part to a first light path of an output light of the light source; wherein a part of the light from the first light emitting source is prevented from entering the first light path by the second light guiding part, and wherein a luminous flux of the prevented part of the light is less than a luminous flux of the light from the first light emitting source that enters the first light path.

10. The light source of claim 9, wherein the second light guiding part comprises a reflecting device in the incident light path of the second light emitting source for reflecting the light of the second light emitting source to the rough surface structure of the first light emitting source; wherein a part of the light from the first light emitting source is prevented from entering the first light path by being reflected by the reflecting device, and wherein a luminous flux of the prevented part of the light is smaller than $\frac{1}{5}$ of a luminous flux of the light from the first light emitting source that enters the first light path.

11. The light source of claim 9, further comprising a light collection part, wherein the light emitting surface of the first light emitting source is located at an entrance of the light collection part.

12. A light source, comprising:
a first light emitting source having a first etendue;
a second light emitting source having a second etendue which is smaller than $\frac{1}{5}$ of the first etendue of the first light emitting source;
wherein lights from the first light emitting source and the second light emitting source have the same color; and
a light combining device for combining the lights from the first light emitting source and the second light emitting source as an output light along in a first light path, wherein:
the light combining device comprises a first light guiding part for guiding a light from the first light emitting source into the first light path, and a second light guiding part for guiding a light from the second light emitting source into the first light path; the second light guiding part also preventing a part of the light from the first light emitting source from entering the first light path, and wherein a luminous flux of the prevented part of light is less than a luminous flux of the light from the first light emitting source that enters the first light path through the light combining device,
wherein the first light guiding part of the light combining device comprises a curved reflecting cup and the second light guiding part is at least one through hole or light transmitting hole formed on the curved reflecting cup, wherein the light from the first light emitting source is incident onto the reflecting cup from a first side and reflected by a part of other than the through hole or the light transmitting hole to enter the first light path; wherein the second light guiding part comprises the through hole or light transmitting hole, wherein a part of light from the first light emitting source is prevented from entering the first light path by passing through the through hole or transmitting hole, and wherein the light from the second light emitting source is incident into the through hole or transmitting hole from a second side of the reflecting cup and enters the first light path, and
wherein after passing through the through hole or light transmitting hole, the light of the second light emitting source is incident onto a light emitting surface of the first light emitting source and scattered by the light emitting surface to enter the first light path.

13. The light source of claim 12, further comprising a light collection part, wherein after passing through the through hole or light transmitting hole, the light of the second light emitting source is incident onto an entrance of the light collection part; wherein the curved reflecting cup is semi-ellipsoid shaped, and the light emitting surface of the first light emitting source and the entrance of the light collection part are respectively located on different focuses of the curved reflecting cup; or, the curved reflecting cup is semi-sphere shaped, the light emitting surface of the first light emitting source and the entrance of the light collection part are respectively located on two symmetrical points near the spherical center of the curved reflecting cup.

14. The light source of claim 12, wherein the first light guiding part of the light combining device comprises a light guiding device which is hollow inside with reflective side surfaces and the second light guiding part is at least one through hole or light transmitting hole formed on the side surfaces, and wherein the light from the first light emitting source is incident into the light guiding device from a first end and reflected by parts of the side surfaces other than the through hole or the light transmitting hole to a second end to enter the first light path; wherein the second light guiding part is the through hole or light transmitting hole, a part of light from the first light emitting source is prevented from entering the first light path by passing through the through hole or transmitting hole, and the light from the second light emitting source is incident on the side surfaces of the light guiding device through the through hole or transmitting hole and reflected by the side surfaces and propagates towards the second end of the light guiding device to enter the first light path.

15. The light source of claim 12, wherein the first light guiding part of the light combining device comprises a light guiding device with reflective side surfaces and the second light guiding part is at least one wedge shaped reflecting part formed on the side surfaces, and wherein the light from the first light emitting source is incident into the light guiding device from a first end and reflected by parts of the side surface other than the wedge shaped reflecting part to a second end to enter the first light path; wherein the second light guiding part is the wedge shaped reflecting part, a part of light from the first light emitting source is prevented from entering the first light path by being reflected by the wedge shaped reflecting part, and the light from the second light emitting source is incident on the wedge shaped reflecting part and reflected by the wedge shaped reflecting part to enter the inside of the light guiding device and propagates towards the second end of the light guiding device to enter the first light path.

16. The light source of claim 15, wherein the light guiding device is hollow inside, and the wedge shaped reflecting part is a solid wedge shaped reflecting part; or the light guiding device is solid, and the wedge shaped reflecting part is a wedge shaped reflecting groove.

\* \* \* \* \*